United States Patent
Riley et al.

(10) Patent No.: US 10,823,415 B2
(45) Date of Patent: Nov. 3, 2020

(54) DEFLECTOR FOR COMBUSTOR OF GAS TURBINE ENGINE

(71) Applicant: United Technologies Corporation, Farmington, CT (US)

(72) Inventors: Kristy Rose Riley, Vernon, CT (US); John R. Battye, Lebanon, CT (US); Joanne V. Rampersad, Manchester, CT (US); San Quach, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 236 days.

(21) Appl. No.: 15/995,508

(22) Filed: Jun. 1, 2018

(65) Prior Publication Data
US 2019/0368735 A1    Dec. 5, 2019

(51) Int. Cl.
| | |
|---|---|
| *F23R 3/60* | (2006.01) |
| *F23R 3/00* | (2006.01) |
| *F02C 3/04* | (2006.01) |
| *F23R 3/28* | (2006.01) |
| *F23R 3/10* | (2006.01) |

(52) U.S. Cl.
CPC ............... *F23R 3/002* (2013.01); *F02C 3/04* (2013.01); *F23R 3/10* (2013.01); *F23R 3/28* (2013.01); *F23R 3/60* (2013.01); *F05D 2220/323* (2013.01); *F05D 2240/35* (2013.01)

(58) Field of Classification Search
CPC .... F23R 3/002; F23R 3/10; F23R 3/60; F05D 2260/231
See application file for complete search history.

(56) References Cited

U.S. PATENT DOCUMENTS

| | | |
|---|---|---|
| 6,957,538 B2 | 10/2005 | Tiemann |
| 7,121,095 B2 | 10/2006 | McMasters et al. |

(Continued)

FOREIGN PATENT DOCUMENTS

| | | |
|---|---|---|
| EP | 1482247 A1 | 12/2004 |
| GB | 2524265 A | 9/2015 |

OTHER PUBLICATIONS

European Search Report Issued in EP Application No. 19165959.8, dated May 6, 2019, 10 Pages.

*Primary Examiner* — Steven M Sutherland
(74) *Attorney, Agent, or Firm* — Cantor Colburn LLP

(57) ABSTRACT

A deflector panel for a combustor of a gas turbine engine includes an outer radial edge, an inner radial edge, and two circumferential edges extending between the outer radial edge and the inner radial edge. Each circumferential edge including a panel scallop at least partially defining a deflector opening receptive of a fuel nozzle of the combustor. A combustor of a gas turbine engine includes a combustor shell at least partially defining a combustion zone therein, and a deflector assembly operably connected to the combustor shell. The deflector assembly includes a plurality of circumferentially abutted deflector panels. Each deflector panel includes an outer radial edge, an inner radial edge, and two circumferential edges extending between the outer radial edge and the inner radial edge. Each circumferential edge includes a panel scallop at least partially defining a deflector opening. A fuel nozzle extends through the deflector opening.

14 Claims, 4 Drawing Sheets

(56) References Cited

U.S. PATENT DOCUMENTS

| | | | |
|---|---|---|---|
| 9,964,307 B2 * | 5/2018 | Sullivan | F23R 3/007 |
| 2003/0061815 A1 * | 4/2003 | Young | B23P 6/00 |
| | | | 60/748 |
| 2004/0237532 A1 * | 12/2004 | Howell | F23R 3/002 |
| | | | 60/748 |
| 2012/0240583 A1 * | 9/2012 | Penz | F23R 3/002 |
| | | | 60/722 |
| 2013/0042627 A1 | 2/2013 | Gerendas et al. | |
| 2013/0247575 A1 * | 9/2013 | Patel | F02C 7/24 |
| | | | 60/752 |

* cited by examiner

DEFLECTOR FOR COMBUSTOR OF GAS TURBINE ENGINE

STATEMENT OF FEDERAL SUPPORT

This invention was made with Government support under contract FA8626-18-F-0018 awarded by the Air Force. The Government has certain rights in the invention.

BACKGROUND

Exemplary embodiments of the present disclosure pertain to the art of gas turbine engines, and more particularly to combustors of gas turbine engines.

Combustors of gas turbine engines utilize a combustor shell to define a combustion zone, where a mixture of fuel and air is ignited. The resulting combustion gas is utilized to drive a turbine. The combustor includes a combustor shell to define the combustion zone. One component of a combustor shell is a deflector, which includes a deflector opening through which a fuel nozzle extends to inject fuel into the combustor.

As shown in FIG. 5, the typical deflector 100 includes a deflector opening 102 located in a center of the deflector 100. Further, the deflector 100 includes mounting studs 104 located at corners of the deflector 100 at a radially outboard end 106 and radially inboard end 108 of the deflector 100. The mounting studs 104 are utilized to secure the deflector 100 to its mounting location in the gas turbine engine. The position of the deflector opening 102 results is circumferentially narrow portions 110 between the deflector opening 102 and circumferential edges 112 of the deflector 100. Due to the operating conditions of the combustor, the deflector 100 is subjected to coating loss and cracking, shown schematically at 114 and 116, respectively, at the narrow portions 110. These issues limit the service life of the deflector 100, resulting in high maintenance costs for the gas turbine engine. Measures such as cooling holes and flow guides, or cooling pins have been utilized in efforts to mitigate the erosion and cracking, but these solutions add significant cost to the components.

BRIEF DESCRIPTION

In one embodiment, a deflector panel for a combustor of a gas turbine engine includes an outer radial edge, an inner radial edge, and two circumferential edges extending between the outer radial edge and the inner radial edge. Each circumferential edge including a panel scallop at least partially defining a deflector opening receptive of a fuel nozzle of the combustor.

Additionally or alternatively, in this or other embodiments a panel neck is defined between the panel scallops.

Additionally or alternatively, in this or other embodiments each panel scallop defines about 50% of the deflector opening.

Additionally or alternatively, in this or other embodiments a plurality of studs extends from the deflector panel.

Additionally or alternatively, in this or other embodiments the plurality of studs are positioned in the circumferential centermost 50% of the deflector panel.

In another embodiment, a combustor of a gas turbine engine includes a combustor shell at least partially defining a combustion zone therein, and a deflector assembly operably connected to the combustor shell. The deflector assembly includes a plurality of circumferentially abutted deflector panels. Each deflector panel includes an outer radial edge, an inner radial edge, and two circumferential edges extending between the outer radial edge and the inner radial edge. Each circumferential edge includes a panel scallop at least partially defining a deflector opening. A fuel nozzle extends through the deflector opening.

Additionally or alternatively, in this or other embodiments panel neck is defined between circumferentially adjacent panel scallops.

Additionally or alternatively, in this or other embodiments each panel scallop defines about 50% of the deflector opening.

Additionally or alternatively, in this or other embodiments a plurality of studs extend from the deflector panel.

Additionally or alternatively, in this or other embodiments the plurality of studs are positioned in the circumferential centermost 50% of the deflector panel.

Additionally or alternatively, in this or other embodiments each deflector panel includes four studs extending therefrom.

Additionally or alternatively, in this or other embodiments a combustor liner is located inboard of the combustor shell, relative to a combustion zone centerline.

Additionally or alternatively, in this or other embodiments the deflector assembly is located at an axially upstream end of the combustor assembly.

In yet another embodiment, a gas turbine engine includes a turbine, and a combustor assembly configured to drive the turbine via combustion products received from the combustor assembly. The combustor assembly includes a combustor shell at least partially defining a combustion zone therein, and a deflector assembly operably connected to the combustor shell. The deflector assembly includes a plurality of circumferentially abutted deflector panels. Each deflector panel includes an outer radial edge, an inner radial edge, and two circumferential edges extending between the outer radial edge and the inner radial edge. Each circumferential edge includes a panel scallop at least partially defining a deflector opening. A fuel nozzle extends through the deflector opening.

Additionally or alternatively, in this or other embodiments a panel neck is defined between circumferentially adjacent panel scallops.

Additionally or alternatively, in this or other embodiments each panel scallop defines about 50% of the deflector opening.

Additionally or alternatively, in this or other embodiments a plurality of studs extend from the deflector panel.

Additionally or alternatively, in this or other embodiments the plurality of studs are located in the circumferential centermost 50% of the deflector panel.

Additionally or alternatively, in this or other embodiments a combustor liner is located inboard of the combustor shell, relative to a combustion zone centerline.

Additionally or alternatively, in this or other embodiments the deflector assembly is located at an axially upstream end of the combustor assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
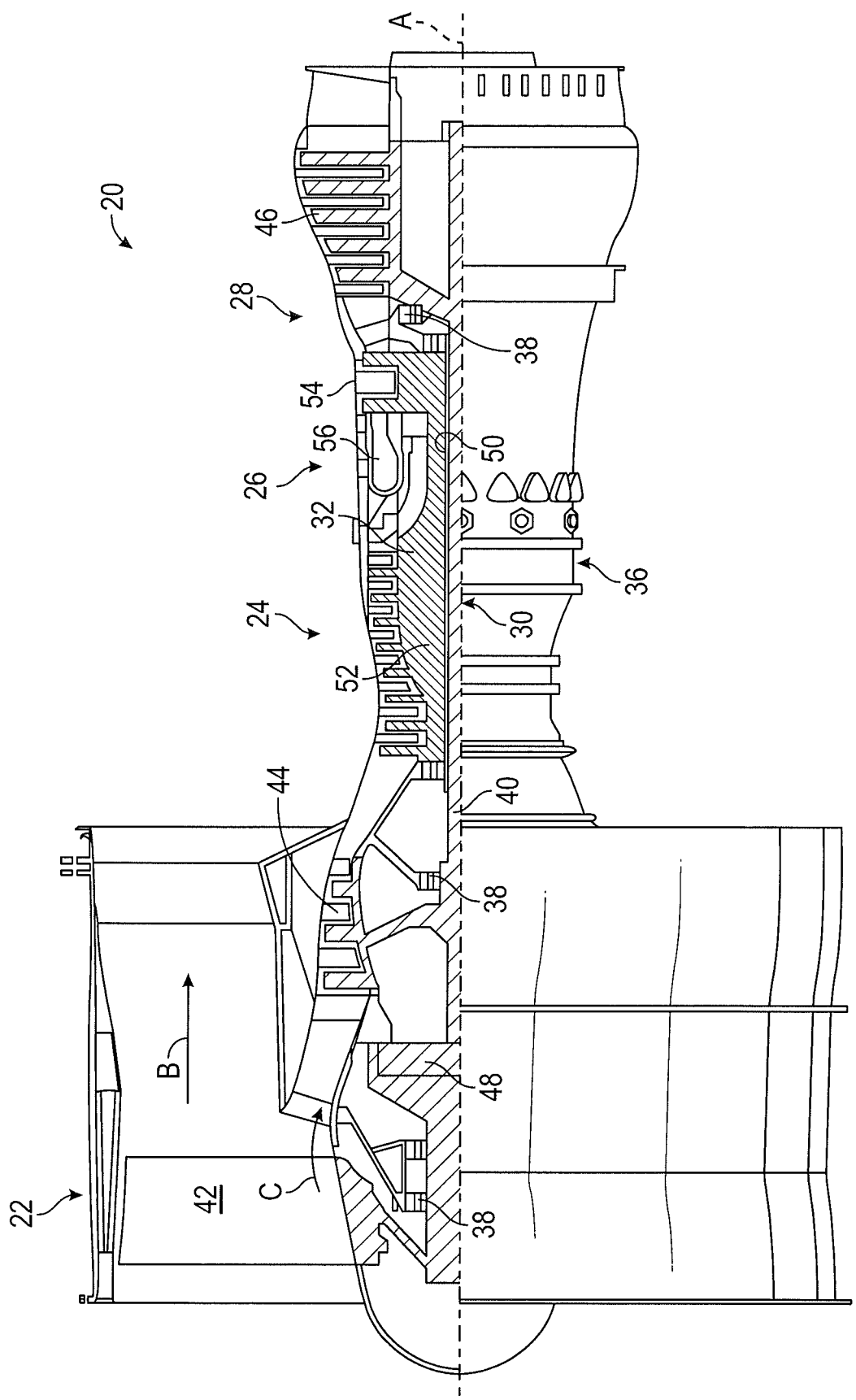
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° \ R)/(518.7° \ R)]^{0.5}$. The "Low corrected fan tip speed" as disclosed herein according to one non-limiting embodiment is less than about 1150 ft/second (350.5 m/sec).

Figure 2:
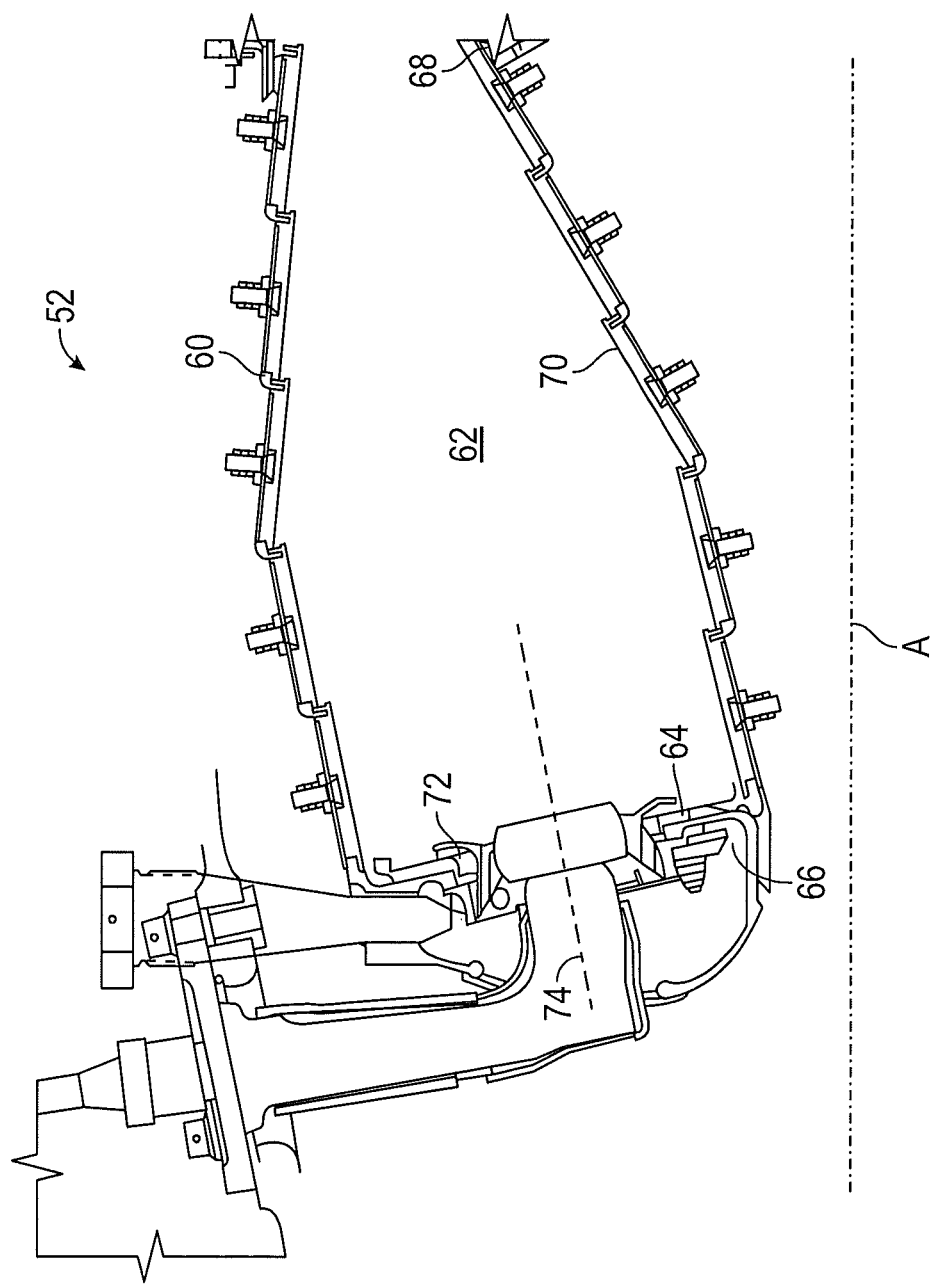
FIG. 2 is a partial cross-sectional view of an embodiment of a combustor of a gas turbine engine.

Referring now to FIG. 2, the combustor 52 extends about the engine central longitudinal axis A and includes a combustor shell 60 defining a combustion zone 62. The combustor shell 60 extends from a deflector 64 at an upstream end 66 of the combustor shell 60 to a downstream end 68 of the combustor shell 60. In some embodiments, a combustor liner 70 is located inboard of the combustor shell 60 relative to a center of the combustion zone 62. The deflector 64 includes a plurality of deflector openings 72, with a fuel nozzle 74 extending through each deflector opening 72. The fuel nozzle 74 admits fuel, or a fuel/air mixture into the combustion zone 62 for combustion.

Figure 3:
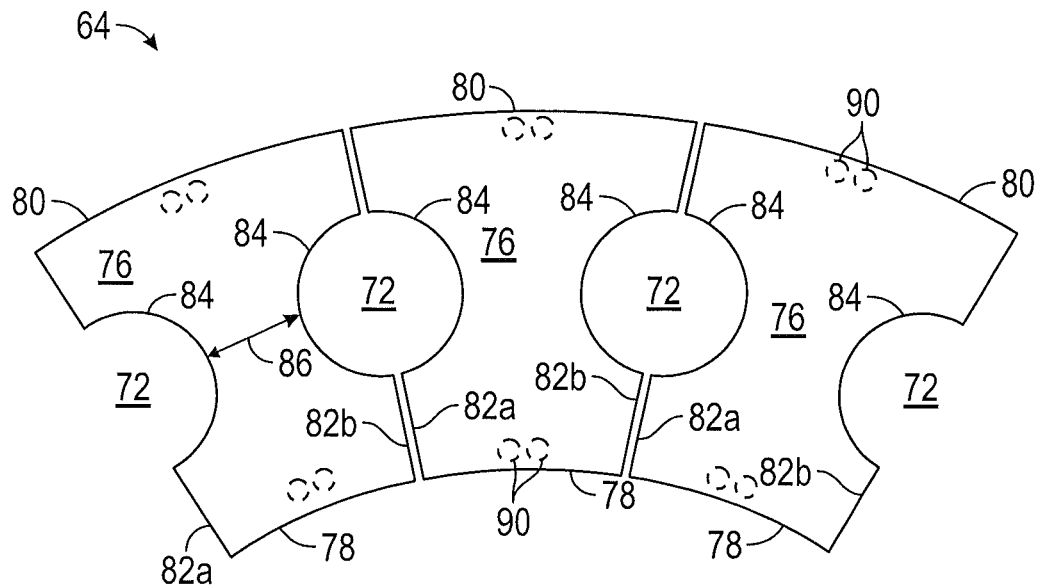
FIG. 3 is partial view looking upstream of an embodiment of a combustor of a gas turbine engine.

Referring to FIG. 3, a partial view of the deflector 64 is illustrated. The deflector 64 assembly includes a plurality of deflector panels 76, with circumferentially adjacent deflector panels 76 abutting. The abutting deflector panels 76 define the plurality of deflector openings 72. Each deflector panel 76 extends from a radially inboard end 78 to a radially outboard end 80 relative to the engine central longitudinal axis A. The deflector panel 76 extends circumferentially from a first circumferential end 82a to a second circumferential end 82b. To form the deflector 64 assembly, adjacent circumferential ends 82a, 82b of adjacent deflector panels 76 are abutted. Each deflector panel 76 includes a panel scallop 84 at each circumferential end 82a, 82b, which together define deflector openings 72 when the deflector panels 76 are abutted. In some embodiments, each panel scallop 84 defines a half of the deflector opening 72.

A panel neck 86 is located circumferentially between the panel scallops 84, defining a circumferentially narrowest portion of the deflector panel 76. Compared to a typical panel having a deflector opening in the center of a panel, this circumferentially narrowest portion of the deflector panel 76 is wider than the circumferentially narrowest portion of the typical panel. In some embodiments, the panel neck 86 is up to twice as wide as the circumferentially narrowest portion of the typical deflector panel. The circumferentially wider panel neck 86 results in a deflector panel 76 less susceptible to cracking.

Figure 4:
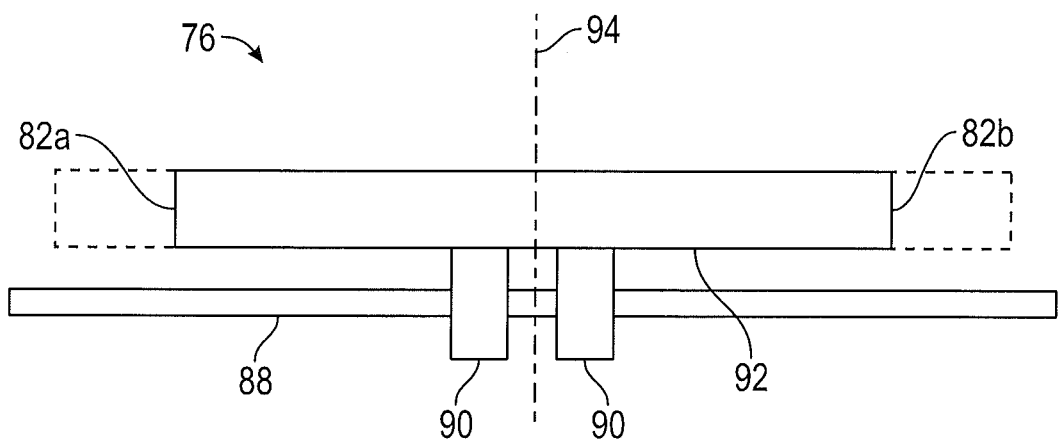
FIG. 4 is an end view of an embodiment of a deflector panel.
Figure 5:
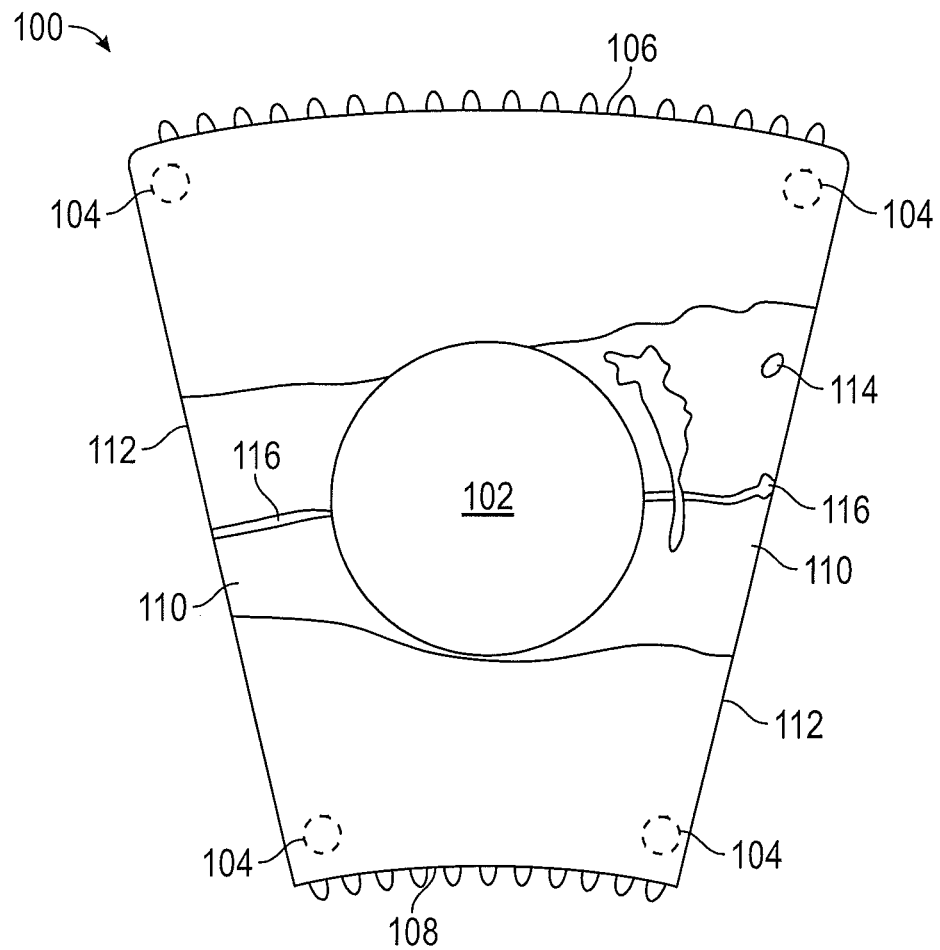
FIG. 5 is a plan view of a typical deflector panel.

Referring to FIG. 4, the deflector panel 76 is fixed to backing structure 88 via a plurality of fasteners, such as studs 90 extending from a back face 92 of the deflector panel 76. In some embodiments four studs 90 are utilized, while in other embodiments other quantities of studs 90 may be used. The studs 90 are located at or near a circumferential centerline 94 of the deflector panel 76. In some embodiments, the studs 90 are located in the centermost 50% of the deflector panel 76 circumferential span. Location of the studs 90 at or near the circumferential centerline 94 leaves the circumferential ends 82a and 82b unrestrained, allowing for deflection of the circumferential ends 82a and 82b during operation of the combustor 52. This configuration lowers stresses in the deflector panel 76, resulting in the deflector panels 76 being less susceptible to cracking compared with a typical prior art deflector panel, such as the panel 100 of FIG. 5.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A deflector panel for a combustor of a gas turbine engine, comprising:
   an outer radial edge;
   an inner radial edge;
   two circumferential edges extending between the outer radial edge and the inner radial edge, each circumferential edge including a panel scallop at least partially defining a deflector opening receptive of a fuel nozzle of the combustor; and
   a plurality of studs extending from the deflector panel;
   wherein the plurality of studs are disposed in the circumferential centermost 50% of the deflector panel.

2. The deflector panel of claim 1, further comprising a panel neck defined between the panel scallops.

3. The deflector panel of claim 1, wherein each panel scallop defines about 50% of the deflector opening.

4. A combustor of a gas turbine engine, comprising:
   a combustor shell at least partially defining a combustion zone therein;
   a deflector assembly operably connected to the combustor shell, the deflector assembly including a plurality of circumferentially abutted deflector panels, each deflector panel including:
      an outer radial edge;
      an inner radial edge;
      two circumferential edges extending between the outer radial edge and the inner radial edge, each circumferential edge including a panel scallop at least partially defining a deflector opening; and
      a plurality of studs extending from the deflector panel, the plurality of studs are disposed in the circumferential centermost 50% of the deflector panel; and
   a fuel nozzle extending through the deflector opening.

5. The combustor assembly of claim 4, further comprising a panel neck defined between circumferentially adjacent panel scallops.

6. The combustor assembly of claim 4, wherein each panel scallop defines about 50% of the deflector opening.

7. The combustor assembly of claim 4, wherein each deflector panel includes four studs extending therefrom.

8. The combustor assembly of claim 4, further comprising a combustor liner disposed inboard of the combustor shell, relative to a combustion zone centerline.

9. The combustor assembly of claim 4, wherein the deflector assembly is disposed at an axially upstream end of the combustor assembly.

10. A gas turbine engine, comprising:
    a turbine; and
    a combustor assembly configured to drive the turbine via combustion products received from the combustor assembly, the combustor assembly including:
       a combustor shell at least partially defining a combustion zone therein;
       a deflector assembly operably connected to the combustor shell, the deflector assembly including a plurality of circumferentially abutted deflector panels, each deflector panel including:
          an outer radial edge;
          an inner radial edge;
          two circumferential edges extending between the outer radial edge and the inner radial edge, each circumferential edge including a panel scallop at least partially defining a deflector opening; and
          a plurality of studs extending from the deflector panel, the plurality of studs are disposed in the circumferential centermost 50% of the deflector panel; and
       a fuel nozzle extending through the deflector opening.

11. The gas turbine engine of claim 10, further comprising a panel neck defined between circumferentially adjacent panel scallops.

12. The gas turbine engine of claim 10, wherein each panel scallop defines about 50% of the deflector opening.

13. The gas turbine engine of claim 10, further comprising a combustor liner disposed inboard of the combustor shell, relative to a combustion zone centerline.

14. The gas turbine engine of claim 10, wherein the deflector assembly is disposed at an axially upstream end of the combustor assembly.

* * * * *